US010029354B2

(12) United States Patent
Weller

(10) Patent No.: US 10,029,354 B2
(45) Date of Patent: Jul. 24, 2018

(54) HEND-HELD MACHINE TOOL

(71) Applicant: Robert Bosch GmbH, Stuttgart (DE)

(72) Inventor: Thomas Weller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 14/434,068

(22) PCT Filed: Oct. 8, 2013

(86) PCT No.: PCT/EP2013/070935
§ 371 (c)(1),
(2) Date: Apr. 7, 2015

(87) PCT Pub. No.: WO2014/056905
PCT Pub. Date: Apr. 17, 2014

(65) Prior Publication Data
US 2015/0266170 A1    Sep. 24, 2015

(30) Foreign Application Priority Data

Oct. 8, 2012  (DE) .................. 10 2012 218 277
Oct. 8, 2012  (DE) .................. 10 2012 218 279

(51) Int. Cl.
*B25B 21/00*    (2006.01)
*B25B 21/02*    (2006.01)
(Continued)

(52) U.S. Cl.
CPC ............ *B25B 21/00* (2013.01); *B23B 31/123* (2013.01); *B25B 21/02* (2013.01); *B25B 23/14* (2013.01); *B25B 23/141* (2013.01)

(58) Field of Classification Search
CPC ....... B25B 21/00; B25B 23/147; B25B 23/18; B25B 23/14; B25B 23/1456; B25B 23/0007; B25B 23/0035
See application file for complete search history.

(56) References Cited

U.S. PATENT DOCUMENTS 3,168,944 A * 2/1965 Livermont ............ B25B 23/141
                                                    192/56.53
3,369,615 A * 2/1968 Maffey, Jr. ............ B25B 21/026
                                                    173/93.6
(Continued)

FOREIGN PATENT DOCUMENTS

AU    2011204260 A1    6/2012
CN       1672879 A     9/2005
(Continued)

OTHER PUBLICATIONS

International Search Report corresponding to PCT Application No. PCT/EP2013/070935, dated Jan. 16, 2014 (German and English language document) (5 pages).

*Primary Examiner* — Christopher M Koehler
*Assistant Examiner* — Seahee Yoon
(74) *Attorney, Agent, or Firm* — Maginot, Moore & Beck LLP

(57) ABSTRACT

A hand-held power tool comprises a tool receiver, a drive spindle, and at least one active drive unit configured to drive the tool receiver via the drive spindle. The tool receiver and the drive spindle are moveable with respect to each other and connected in the circumferential direction via a form-fit connection.

20 Claims, 13 Drawing Sheets

(51) Int. Cl.
*B25B 23/14* (2006.01)
*B23B 31/12* (2006.01)

(56) References Cited

U.S. PATENT DOCUMENTS

| | | | | |
|---|---|---|---|---|
| 3,890,859 | A * | 6/1975 | Grabovac | B25B 23/1427 81/474 |
| 4,208,555 | A * | 6/1980 | Ikeda | B25B 23/147 192/150 |
| 4,243,129 | A * | 1/1981 | Schoeps | F16D 13/08 173/178 |
| 4,617,843 | A * | 10/1986 | Nishida | B25B 23/147 81/429 |
| 4,880,064 | A * | 11/1989 | Willoughby | B25B 23/141 173/178 |
| 4,947,714 | A * | 8/1990 | Fluri | B25B 23/0064 81/475 |
| 5,735,183 | A * | 4/1998 | Sasaki | B25B 21/00 192/81 C |
| 6,923,268 | B2 * | 8/2005 | Totsu | B25B 21/00 173/170 |
| 7,740,369 | B2 * | 6/2010 | Gabriel | B25B 21/00 362/119 |
| 7,878,090 | B2 * | 2/2011 | Leupert | B25B 23/18 362/119 |
| 9,321,156 | B2 * | 4/2016 | Eshleman | B25B 21/00 |
| 2002/0130007 | A1 * | 9/2002 | Nakamura | B25B 21/00 192/38 |
| 2003/0098168 | A1 * | 5/2003 | Frauhammer | B25D 17/06 173/47 |
| 2006/0096767 | A1 * | 5/2006 | Miller | B25B 21/00 173/2 |
| 2006/0237205 | A1 * | 10/2006 | Sia | B25B 21/00 173/48 |
| 2007/0144753 | A1 | 6/2007 | Miller | |
| 2012/0106133 | A1 * | 5/2012 | Roehm | B25B 23/18 362/119 |
| 2013/0284471 | A1 * | 10/2013 | Eshleman | B25B 21/00 173/1 |
| 2013/0327190 | A1 * | 12/2013 | Laurenti | B25B 23/1427 81/475 |
| 2014/0026835 | A1 * | 1/2014 | Boese | F01L 1/344 123/90.12 |

FOREIGN PATENT DOCUMENTS

| | | |
|---|---|---|
| CN | 782445 A | 6/2006 |
| CN | 201220286 Y | 4/2009 |
| CN | 101466501 A | 6/2009 |
| CN | 101754835 A | 6/2010 |
| DE | 10 2007 019 434 A1 | 10/2008 |
| DE | 10 2011 004 364 A1 | 8/2012 |
| EP | 0 591 574 A1 | 4/1994 |
| TW | 578655 U | 3/2004 |
| WO | 2012/023452 A1 | 2/2012 |
| WO | 2012/110485 A1 | 8/2012 |

\* cited by examiner

HEND-HELD MACHINE TOOL

This application is a 35 U.S.C. § 371 National Stage Application of PCT/EP2013/070935, filed on Oct. 8, 2013, which claims the benefit of priority to Serial No. DE 10 2012 218 277.2 filed on Oct. 8, 2012 in Germany and Serial No. DE 10 2012 218 279.9 filed on Oct. 8, 2012 in Germany, the disclosures of which are both incorporated herein by reference in their entireties.

A hand-held power tool has already been proposed, in particular a hand-held power screwdriver, comprising a tool receiver, a drive spindle, and at least one active drive unit for driving the tool receiver by means of the drive spindle.

SUMMARY

The disclosure is based on a hand-held power tool, in particular a hand-held power screwdriver, comprising a tool receiver, a drive spindle, and at least one active drive unit for driving the tool receiver by means of the drive spindle.

It is proposed that the tool receiver and the drive spindle be realized such that they are separate from each other and connected in the circumferential direction by means of a form-fit connection. A "hand power tool" in this context is to be understood to mean, in particular, a machine for performing machining work on workpieces, but advantageously a power drill, a hammer drill and/or percussion hammer, a saw, a plane, a screwdriver, a router, a sander, an angle grinder, a garden appliance and/or a multifunction tool. Preferably, this is to be understood to be a portable power tool that can be transported by an operator without the use of a transport machine. Particularly preferably, the hand-held power tool has, in particular, a mass of less than 40 kg, preferably less than 10 kg, and particularly preferably less than 5 kg. Further, a "tool receiver" in this context is to be understood to mean, in particular, an element of the hand-held power tool that is provided to enable an operator to detachably and directly fasten an insert tool, at least in a rotationally fixed manner. Preferably, this is to be understood to mean, in particular, an element comprising a receiving region that has at least one contour, in particular a hexagonal contour, for fastening an insert tool in a rotationally fixed manner. Particularly preferably, the tool receiver has a magnetic bit holder. A "drive spindle" in this context is to be understood to mean, in particular, a mechanical shaft provided to be driven directly or indirectly by a drive unit, in particular by a motor unit. Preferably, this is to be understood to mean, in particular, a shaft that is directly or indirectly connected to a tool receiver. Particularly preferably, this is to be understood to be, in particular, a shaft that, in the power transmission direction along a drive train, is disposed behind the drive unit and/or in particular behind a transmission unit and/or projects out of the latter. In this case, a "drive train" in this context is to be understood to mean, in particular, all elements of the hand-held power tool that are provided to transmit a rotational speed and/or a torque from at least one part of the active drive unit, in particular a motor unit, to a tool disposed in the tool receiver, during operation. Furthermore, an "active drive unit" in this context is to be understood to mean, in particular, a drive unit comprising at least all parts and/or all units of a drive train of the hand-held power tool that are directly provided to alter and/or generate a torque transmitted along the drive train and/or, in particular, a rotational speed transmitted along the drive train. Preferably, the active drive unit has at least one motor unit. A "motor unit" in this case is to be understood to mean, in particular, an electrical and/or mechanical and/or pneumatic motor unit that is provided, advantageously, to generate a rotary motion when in operation. Various motor units, considered appropriate by persons skilled in the art, are conceivable but, advantageously, this is to be understood to mean, in particular, an electric motor. "Separate" in this context is to be understood to mean, in particular, movable relative to each other in a non-destructive manner. Preferably, this is to be understood to mean, in particular, relatively movable in a non-destructive manner at least to the point of non-contact. Further, a "form-fit connection" in this context is to be understood to mean, in particular, a connection, of at least two components, that is form-fitting in at least one direction. "Form-fitting" in this case is to be understood to mean, in particular, that contiguous faces of components connected to each other in a form-fitting manner exert upon each other a holding force acting in the direction normal to the faces. In particular, the components are in geometric engagement with each other. "Provided" is to be understood to mean, in particular, specially designed and/or specially equipped.

The design of the hand-held power tool according to the disclosure makes it possible, advantageously, to realize transmission of torque and/or rotational speed with the tool receiver being axially displaceable relative to the active drive unit. Moreover, advantageously, it makes it possible to realize a particularly reliable separated connection.

It is additionally proposed that the form-fit connection be constituted by mutually corresponding fitting tooth systems. "Corresponding" in this context is to be understood to mean, in particular, mutually engaging. Preferably, this is to be understood to mean, in particular, mutually engaging in an at least partially fitting manner. Moreover, a "fitting tooth system" in this context is to be understood to mean, in particular, a tooth system for generating a driving connection, a connection having, in particular, at least one element comprising an internal tooth system and one element comprising an external tooth system. Preferably, this is to be understood to mean, in particular, a tooth system having straight tooth flanks. In principle, however, a fitting tooth system having involute flanks and/or having spline flanks, and/or another tooth system considered appropriate by persons skilled in the art, would also be conceivable. A "straight tooth flank" in this case is to be understood to mean, in particular, a tooth flank whose plane of main extent intersects a rotation axis of the tool receiver and/or of the drive spindle and is parallel to the same. Alternatively, this is to be understood to mean, in particular, a tooth flank whose plane of main extent is parallel to a plane that intersects the rotation axis of the tool receiver and/or of the drive spindle and is parallel to the same and extends through a central axis of a tooth of the tooth flank. A "plane of main extent" of a tooth flank in this case is to be understood to mean, in particular, a plane that is parallel to a largest lateral face of a smallest geometric cuboid that only just completely encloses the flank, and that, in particular, extends through the center point of the cuboid. "At least partially" in this context is to be understood to mean, in particular, that a deviation from a predefined value is maximally 30%, preferably maximally 15%, and particularly preferably maximally 5%. It is thereby possible to realize a particularly advantageous transmission of torque and/or rotational speed with the tool receiver being axially displaceable relative to the active drive unit and the drive spindle.

It is further proposed that a fit of the fitting tooth systems be realized as a sliding fit. A "fit" in this context is to be understood to mean, in particular, a dimensional relationship between two corresponding elements, in particular such that are subject to tolerances. Preferably, this is to be understood to mean, in particular, a clearance fit, transition fit or interference fit. Moreover, a "sliding fit" in this context is to be understood to mean, in particular, a clearance fit having a slight clearance. Preferably, this is to be understood to mean, in particular, a clearance fit in which the parts are movable without perceptible play or, in particular, can only just be shifted by hand. It is thereby possible to realize a particularly advantageous transmission of torque and/or rotational speed without canting, with the tool receiver being axially displaceable relative to the active drive unit and the drive spindle.

Additionally or alternatively, it would be conceivable for the form-fit connection to be constituted by corresponding cross-recess connecting elements. "Cross-recess connecting elements" in this context are to be understood to mean, in particular, elements for producing a connection, at least one of the elements having a cross-shaped cross section perpendicularly to a rotation axis of the tool receiver and/or of the drive spindle. Preferably, the corresponding element has a cross-section, perpendicular to a rotation axis of the tool receiver and/or of the drive spindle, that has a negative cross shape.

Further, it is proposed that the drive spindle and the tool receiver are disposed so as to be axially displaceable in relation to each other, at least to a limited extent, via the form-fit connection. This advantageously prevents the form-fit connection from becoming disengaged as a result of a relative axial movement.

Furthermore, it is proposed that the form-fit connection have a circumferential play, in the circumferential direction, about a rotation axis of the drive spindle and/or of the tool receiver. A "circumferential play" in this context is to be understood to mean, in particular, a movement clearance between at least two elements in a circumferential direction. Preferably, the at least two elements can move relative to each other in the circumferential direction without being destroyed and/or undergoing plastic deformation. Particularly preferably, this is to be understood to be a movement clearance in the circumferential direction of more than 0.1°, preferably more than 0.5°, and particularly preferably more than 1° and less than 10°, preferably less than 5°, and particularly preferably less than 3°. It is thereby possible to realize a slight movement of the tool receiver in the circumferential direction, relative to the drive spindle, with an advantageous transmission of torque and/or rotational speed.

It is additionally proposed that the hand-held power tool have at least one acquisition unit for acquiring a characteristic quantity of a circumferential play, in the circumferential direction, about a rotation axis of the drive spindle and/or of the tool receiver, for the purpose of determining a desired direction of rotation. An "acquisition unit" in this context is to be understood to mean, in particular, a unit having at least one sensor unit. Preferably, this is to be understood to be, in particular, a unit provided to acquire at least one characteristic quantity, particularly preferably a characteristic quantity of a torque and/or of a relative force and/or of a rotational speed difference. Various acquisition units, considered appropriate by persons skilled in the art, are conceivable. A "sensor unit" in this case is to be understood to mean, in particular, a unit provided to acquire at least one characteristic quantity and/or a physical property, wherein acquisition may be effected actively, such as, in particular, by generation and emission of an electrical measuring signal, and/or passively, such as, in particular, by acquisition of changes in characteristics of a sensor component. Various sensor units, considered appropriate by persons skilled in the art, are conceivable. Furthermore, a "desired direction of rotation" in this context is to be understood to mean, in particular, a direction of rotation of the tool receiver that is provided for a current case of application of the hand-held power tool. Preferably, this is to be understood to mean, in particular, a direction of rotation of the tool receiver that is provided by an operator for a current operation. Advantageously, a desired direction of rotation of the hand-held power tool can thereby be acquired.

Alternatively, however, it would also be conceivable for the hand-held power tool to have at least one operating unit for manually setting a desired direction of rotation. An "operating unit" in this context is to be understood to mean, in particular, a unit having at least one component that can be actuated directly by an operator and that is provided to influence and/or alter a process and/or a state of a unit coupled to the operating unit, through an actuation and/or through an input of parameters.

It is further proposed that, in the region of the form-fit connection, the tool receiver and/or the drive spindle have at least one receiving region for receiving a reset element, and the reset element be provided to move the tool receiver, relative to the drive spindle, into an initial position, or hold it in the latter. A "receiving region" in this context is to be understood to mean, in particular, a region such as, in particular, a depression or a face, that is provided to receive an element and/or a unit. Moreover, a "reset element" in this context is to be understood to mean, in particular, an element provided to move at least two elements that are movable relative to each other, by means of a restoring force, if possible, into an initial position. Preferably, the restoring force is at least partially independent of a spatial position. Various reset elements, considered appropriate by persons skilled in the art, are conceivable, such as, in particular, spring elements and/or magnet elements. An "initial position" of the tool receiver in this context is to be understood to mean, in particular, a neutral position. Preferably, this is to be understood to mean a position where the hand-held power tool is in a non-operated state. It can thereby be ensured, advantageously, that the tool receiver moves into an initial position in the absence of a counter-force, such that, in particular, a defined neutral state can be defined. In addition, this makes it possible, in particular, to effect an advantageous activation of the active drive unit as a result of a relative movement of the tool receiver.

It is further proposed that the hand-held power tool have a weight force that is less than/equal to a restoring force of the reset element. As a result, advantageously, a tool receiver can be held in an initial position, even when the hand-held power tool is placed directly onto the tool receiver.

It is additionally proposed that the reset element be constituted by at least one coil spring. A "coil spring" in this context is to be understood to mean, in particular, a spring element composed of a cylindrically wound spring wire. Preferably, this is to be understood to mean, in particular, a compression coil spring. In principle, however, other spring elements, considered appropriate by persons skilled in the art, would also be conceivable. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on a variation of the extent and preferably proportional to the variation and which counteracts the variation. An "extent" of an element is to be understood to mean, in particular, a maximum distance of two points of a perpendicular projection of the element onto a plane. A "macroscopic element" is to be understood to mean, in particular, an element having an extent of at least 1 mm, in particular of at least 5 mm, and preferably of at least 10 mm. A particularly advantageous and inexpensive reset element can thereby be provided.

Alternatively, it would be conceivable for the reset element to be constituted by at least one magnet element. A "magnet element" in this context is to be understood to mean, in particular, an element that magnetically attracts or repels certain other bodies. Preferably, this is to be understood to mean, in particular, an element that generates a static magnetic flux without a flow of current. An advantageous reset element can thereby be provided. Advantageously, it is thereby possible to provide a reset element having a progressive force-distance characteristic of the restoring force.

Additionally proposed is a method for producing the hand-held power tool, in which the tool receiver and/or the drive spindle are at least partially sintered and/or subjected to a hardening process. "Sintered" in this context is to be understood to mean, in particular, subjected to a sintering process. A "sintering process" in this case is to be understood to mean, in particular, a process for producing components in which fine-grained material is heated, in particular under pressure, to a temperature just below a melting point. A "hardening process" in this context is to be understood to mean, in particular, a process in which preferably a structure of a material and/or of a component is altered, for the purpose of increasing a mechanical resistance. This ensures, advantageously, that there is little wear, and a long service life is achieved. Moreover, a smooth surface of the tool receiver and/or of the drive spindle can be achieved.

Furthermore, it is proposed that calibrated tools be used in the case of a sintering process. This makes it possible to achieve a particularly high dimensional consistency and a particularly high surface quality.

It is additionally proposed that the activation unit for determining a desired operating state have at least one acquisition unit that is provided to acquire at least one characteristic quantity of a torque and/or of a relative force and/or of a rotational speed difference between the tool receiver and the active drive unit, in the circumferential direction, about a rotation axis of the active drive unit and/or of the tool receiver. A "hand power tool" in this context is to be understood to mean, in particular, a machine for performing machining work on workpieces, but advantageously a power drill, a hammer drill and/or percussion hammer, a saw, a plane, a screwdriver, a router, a sander, an angle grinder, a garden appliance and/or a multifunction tool. Preferably, this is to be understood to be a portable power tool that can be transported by an operator without the use of a transport machine. Particularly preferably, the hand-held power tool has, in particular, a mass of less than 40 kg, preferably less than 10 kg, and particularly preferably less than 5 kg. Furthermore, a "housing unit" in this context is to be understood to mean, in particular, a unit that surrounds at least a greater part of the hand-held power tool and that is provided to protect components of the hand-held power tool. Preferably, the housing unit is constituted by at least two housing shells. In principle, however, it would also be conceivable for the housing unit to be realized as a single piece. In addition, a "tool receiver" in this context is to be understood to mean, in particular, an element of the hand-held power tool that is provided to enable an operator to detachably and directly fasten an insert tool, at least in a rotationally fixed manner. Preferably, this is to be understood to mean, in particular, an element comprising a receiving region that has at least one contour, in particular a hexagonal contour, for fastening an insert tool in a rotationally fixed manner. Particularly preferably, the tool receiver has a magnetic bit holder. In principle, however, it would also be conceivable for the tool receiver to be realized as a plurality of parts. Furthermore, an "active drive unit" in this context is to be understood to mean, in particular, a drive unit comprising at least all parts and/or all units of a drive train of the hand-held power tool that are directly provided to alter and/or generate a torque transmitted along the drive train and/or, in particular, a rotational speed transmitted along the drive train. A "motor unit" in this case is to be understood to mean, in particular, an electrical and/or mechanical and/or pneumatic motor unit that is provided, advantageously, to generate a rotary motion when in operation. Various motor units, considered appropriate by persons skilled in the art, are conceivable but, advantageously, this is to be understood to mean, in particular, an electric motor. An "activation unit" in this context is to be understood to mean, in particular an open-loop and/or closed-loop control unit provided to control the active drive unit. Preferably, this is to be understood to mean, in particular, an open-loop and/or closed-loop control unit provided to control the motor unit of the active drive unit. Preferably, this is to be understood to mean, in particular, an open-loop and/or closed-loop control unit provided at least to activate and/or deactivate the active drive unit. Particularly preferably, this is to be understood to mean, in particular, an open-loop and/or closed-loop control unit provided to set a direction of rotation of the active drive unit. An "open-loop and/or closed-loop control unit" in this case is to be understood to mean, in particular, an electronic unit that is preferably integrated, at least partially, in electronics of a hand-held power tool, and that is preferably provided to control at least the active drive unit by open-loop and/or closed-loop control. Preferably, the open-loop and/or closed-loop control unit comprises a computing unit and, in particular, in addition to the computing unit, a memory storage unit having, stored therein, an open-loop and/or closed-loop control program provided to be executed by the computing unit. Furthermore, a "desired operating state" in this context is to be understood to mean, in particular, an operating state of the hand-held power tool that is provided for a current case of application of the hand-held power tool. Preferably, this is to be understood to mean, in particular, an operating state of the hand-held power tool that is provided by an operator for a current operation. Furthermore, an "acquisition unit" in this context is to be understood to mean, in particular, a unit having at least one sensor unit. Preferably, this is to be understood to be, in particular, a unit provided to acquire at least one characteristic quantity, particularly preferably a characteristic quantity of a torque and/or of a relative force and/or of a rotational speed difference. Various acquisition units, considered appropriate by persons skilled in the art, are conceivable. "Between the tool receiver and the active drive unit" in this context is to be understood to mean, in particular, between at least two elements of a drive train, spatially on a rotation axis of the drive train and/or along a power flow of the drive train, between at least one element of the tool receiver and at least one element of the active drive unit. In this case, a "drive train" in this context is to be understood to mean, in particular, all elements of the hand-held power tool that are provided to transmit a rotational speed and/or a torque from the motor unit to a tool disposed in the tool receiver, during operation. Moreover, in this context, "provided" is to be understood to mean, in particular, specially designed and/or specially equipped. "At least partially" in this context is to be understood to mean, in particular, that a deviation from a predefined value is maximally 30%, preferably maximally 15%, and particularly preferably maximally 5%.

Advantageously, the design of the hand-held power tool according to the disclosure enables a desired operating state of the hand-held power tool to be acquired. Preferably, a desired operating state of the hand-held power tool can thereby be acquired without a switch. In addition, this enables the active drive unit to be controlled directly, according to the desired operating state.

It is additionally proposed that the hand-held power tool have a spindle lock device, which is provided to block the tool receiver against turning in the absence of transmission of rotational speed and/or torque from the active drive unit. A "spindle lock device" in this context is to be understood to mean, in particular, a device provided to prohibit and/or prevent a rotary motion of a spindle and/or of a tool receiver, in at least one operating state. Preferably, this is to be understood to mean, in particular, a device provided to prohibit and/or prevent a rotary motion of a spindle and/or of a tool receiver when the hand-held power tool, in particular a drive unit of the hand-held power tool, is in a switched-off state. It is thereby possible, advantageously, to acquire a characteristic quantity of a torque and/or of a relative force and/or of a rotational speed difference between the tool receiver and the active drive unit.

It is further proposed that the activation unit be provided to determine a desired direction of rotation of the tool receiver. Preferably, a desired direction of rotation is provided by an operator. Particularly preferably, a desired direction of rotation is provided by an operator without the use of a switch. A "desired direction of rotation" in this context is to be understood to mean, in particular, a direction of rotation of the tool receiver that is provided for a current case of application of the hand-held power tool. Preferably, this is to be understood to mean, in particular, a direction of rotation of the tool receiver that is provided by an operator for a current operation. It can thereby be achieved, advantageously, that the activation unit itself determines a desired direction of rotation and controls the active drive unit according to this desired direction of rotation.

It is additionally proposed that, between the tool receiver and the active drive unit, there is a circumferential play, in the circumferential direction, about a rotation axis of the active drive unit and/or of the tool receiver. A "circumferential play" in this context is to be understood to mean, in particular, a movement clearance between at least two elements in a circumferential direction. Preferably, the at least two elements can move relative to each other in the circumferential direction without being destroyed and/or undergoing plastic deformation. Particularly preferably, this is to be understood to be a movement clearance in the circumferential direction of more than 0.1°, preferably more than 0.5°, and particularly preferably more than 1° and less than 10°, preferably less than 5°, and particularly preferably less than 3°. It is thereby possible, advantageously, to realize a rotational speed difference between the tool receiver and the active drive unit. This makes it possible, advantageously, for an operator to achieve a rotational speed difference in a particularly simple and convenient manner. Moreover, a rotational speed difference can thereby be achieved with particularly simple design means.

Furthermore, it is proposed that the tool receiver and the active drive unit be realized such that they are separate from each other and connected in the circumferential direction by means of a form-fit connection. Preferably, the hand-held power tool has a drive spindle via which the tool receiver is driven by the active drive unit, the tool receiver and the drive spindle being realized such that they are separate from each other and connected in the circumferential direction by means of a form-fit connection. "Separate" in this context is to be understood to mean, in particular, movable relative to each other in a non-destructive manner. Preferably, this is to be understood to mean, in particular, relatively movable in a non-destructive manner at least to the point of non-contact. Moreover, in this context, a "form-fit connection" is to be understood to mean, in particular, a connection of at least two components that is form-fitting in at least one direction. "Form-fitting" in this case is to be understood to mean, in particular, that contiguous faces of components connected to each other in a form-fitting manner exert upon each other a holding force acting in the direction normal to the faces. In particular, the components are in geometric engagement with each other. A "drive spindle" in this context is to be understood to mean, in particular, a mechanical shaft provided to be driven directly or indirectly by a drive unit, in particular by a motor unit. Preferably, this is to be understood to mean, in particular, a shaft that is directly or indirectly connected to a tool receiver. Particularly, preferably, this is to be understood to be, in particular, a shaft that, in the power transmission direction along a drive train, is disposed behind the drive unit and/or in particular behind a transmission unit and/or projects out of the latter. It is thereby possible to realize an advantageous transmission of torque and/or rotational speed with axial displaceability. Moreover, advantageously, a circumferential play can thereby be realized with simple design means.

It is additionally proposed that the acquisition unit have at least one sensor unit for acquiring at least one characteristic quantity of a rotational speed of the tool receiver. A "sensor unit" in this context is to be understood to mean, in particular, a unit provided to acquire at least one characteristic value and/or a physical property, wherein acquisition may be effected actively, such as, in particular, by generation and emission of an electrical measuring signal, and/or passively, such as, in particular, by acquisition of changes in characteristics of a sensor component. Various sensor units, considered appropriate by persons skilled in the art, are conceivable. Advantageously, a rotational speed can thereby be determined for a rotational speed difference. Moreover, this provides particularly advantageous acquisition of a characteristic quantity.

It is further proposed that the acquisition unit have at least one sensor unit provided to acquire a rotary motion of the housing unit relative to the tool receiver. In principle, however, it would also be conceivable for the sensor unit to be provided to acquire a characteristic quantity of a torque between the housing unit and the tool receiver. This makes it possible, advantageously, to determine a rotational speed difference. Preferably, it is thereby possible, in particular in the case of a hand-held power tool having a spindle lock device and a circumferential play between the tool receiver and the active drive unit, advantageously to determine a rotational speed difference and/or a torque between the tool receiver and the active drive unit.

It is additionally proposed that a measuring axis of the sensor unit be aligned coaxially in relation to a rotation axis of the tool receiver. A "measuring axis" in this context is to be understood to mean, in particular, an axis that defines a measurement point and/or at least one measurement parameter of a sensor unit. Preferably, this is to be understood to mean, in particular, a measuring axis of a rotational-speed sensor and/or of a rotary-motion sensor that defines an axis about which a rotational speed and/or a rotary motion is sensed.

It is additionally proposed that the sensor unit be constituted by at least one rotation rate sensor. A "rotation rate sensor" in this context is to be understood to mean, in particular, a sensor provided to acquire a rotation velocity of a unit and/or of an element and/or of another body. Preferably, this is to be understood to mean, in particular, a sensor provided to acquire an angular velocity about a measuring axis. Particularly preferably, this is to be understood to mean, in particular, a sensor whose measurement principle is based, at least partially, on the Coriolis force and/or the Sagnac effect. This enables a rotational speed and/or a rotary motion to be sensed in a particularly precise manner. Moreover, this makes it possible to provide a particularly compact sensor unit for acquiring a rotational speed and/or, in particular, a rotary motion.

It is furthermore proposed that the sensor unit be constituted by at least one acceleration sensor. An "acceleration sensor" in this context is to be understood to mean, in particular, a sensor provided to measure an acceleration. Preferably, during a measurement, an inertial force acting upon a test mass of the acceleration sensor is determined, and an acceleration can be inferred from this inertial force. Various acceleration sensors, considered appropriate by persons skilled in the art, are conceivable. A rotational speed and/or a rotary motion can thereby be sensed particularly easily.

The hand power tool according to the disclosure is not intended in this case to be limited to the application and embodiment described above. In particular, the hand power tool according to the disclosure may have individual elements, components and units that differ in number from a number stated herein, in order to fulfill a principle of function described herein.

BRIEF DESCRIPTION OF THE DRAWINGS

Further advantages are given by the following description of the drawing. The drawing shows six exemplary embodiments of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
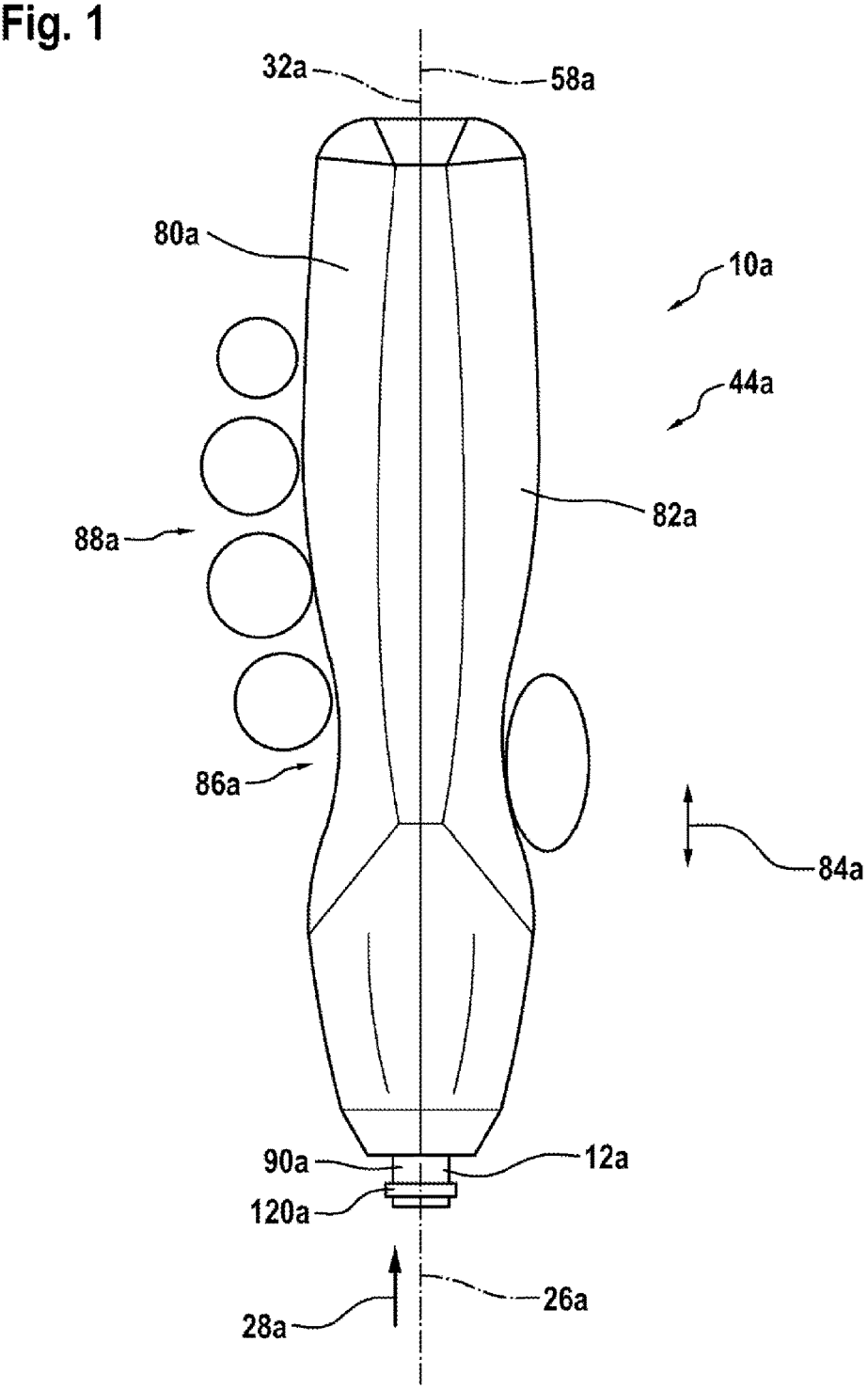
FIG. 1 depicts a hand-held power tool according to the disclosure, with an indicated operator grip position, in a schematic representation.

FIG. 1 shows a hand-held power tool 10*a* according to the disclosure, with an indicated operator grip position. The hand-held power tool 10*a* is constituted by a hand-held power screwdriver. The hand-held power tool 10*a* is approximately in the shape of a screwdriver. The hand-held power tool 10*a* has a housing unit 44*a* and a tool receiver 12*a*. The housing unit 44*a* is realized in two parts. The housing unit 44*a* has two housing shell elements 80*a*, 82*a*. The two housing shell elements 80*a*, 82*a* are provided to enclose components of the hand-held power tool 10*a*, when in an assembled state. The tool receiver 12*a* projects partially out of the housing unit 44*a*. The tool receiver 12*a* partially out of the housing unit 44*a* in a front region of the hand-held power tool 10*a*, as viewed along a direction of main extent 84*a* of the hand-held power tool 10*a*. In principle, however, it would also be conceivable for the tool receiver 12*a* to be in flush alignment with the housing unit 44*a* or partially recessed in the housing unit 44*a*. The housing unit 44*a* of the hand-held power tool 10*a*, as viewed along the direction of main extent 84*a* of the hand-held power tool 10*a*, has a taper 86*a* in a central region. The purpose of the taper 86*a* is to make it difficult for an operator's hand 88*a* to slip off in an axial direction, along the direction of main extent 84*a*. The taper 86*a* is provided to receive a thumb and an index finger of the operator's hand 88*a* when the hand-held power tool 10*a* is in operation. In principle, however, it would also be conceivable for the housing unit 44a, as viewed along the direction of main extent 84a of the hand-held power tool 10a, to have an elevation in a central region.

On a side that faces away from the housing unit 44a, the tool receiver 12a of the hand-held power tool 10a has a magnetic bit holder 90a, which has a hexagonal internal contour. The bit holder 90a is provided to receive a bit. The tool receiver 12a is sintered, and subjected to a hardening process during production. Calibrated tools are used in the sintering process.

Figure 2:
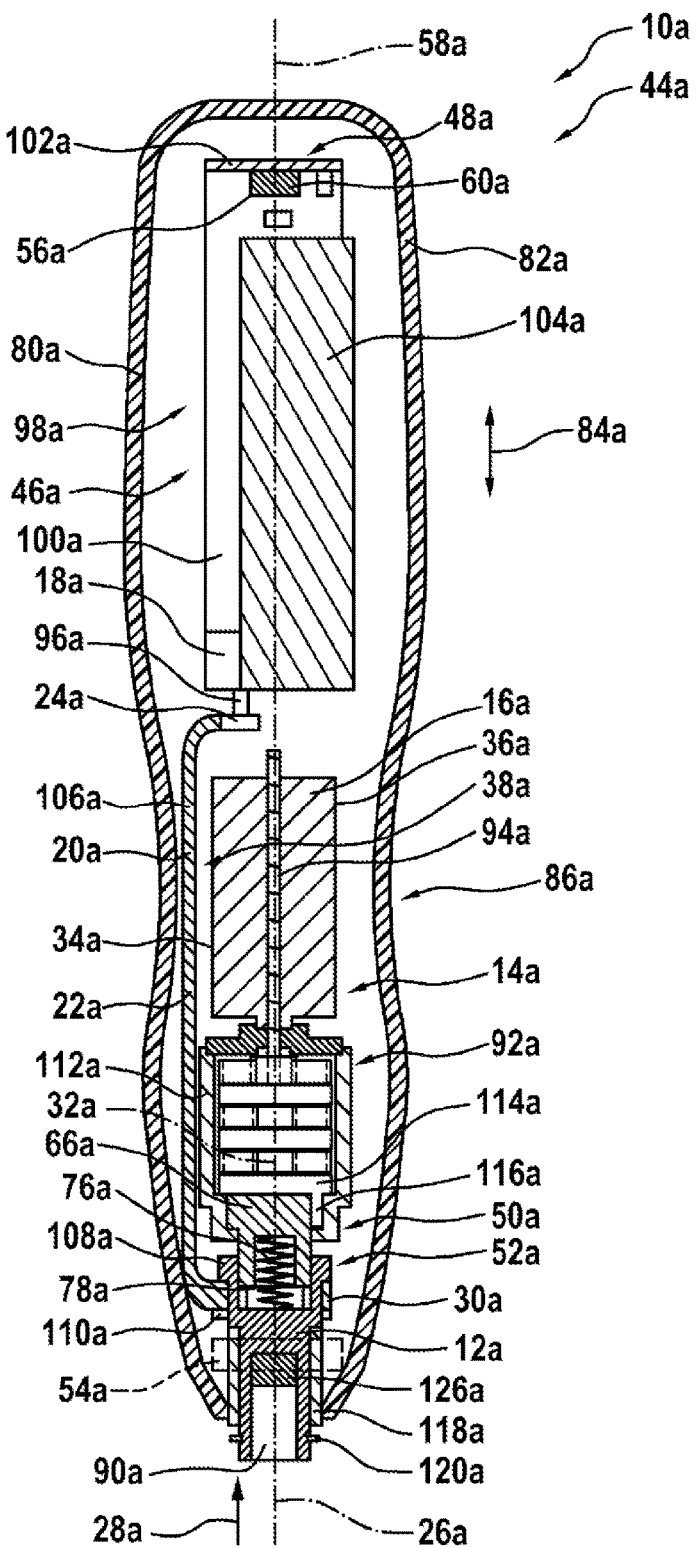
FIG. 2 depicts a hand-held power tool according to the disclosure, in a schematic sectional representation having a section plane parallel to a direction of main extent of the hand-held power tool.
Figure 3:
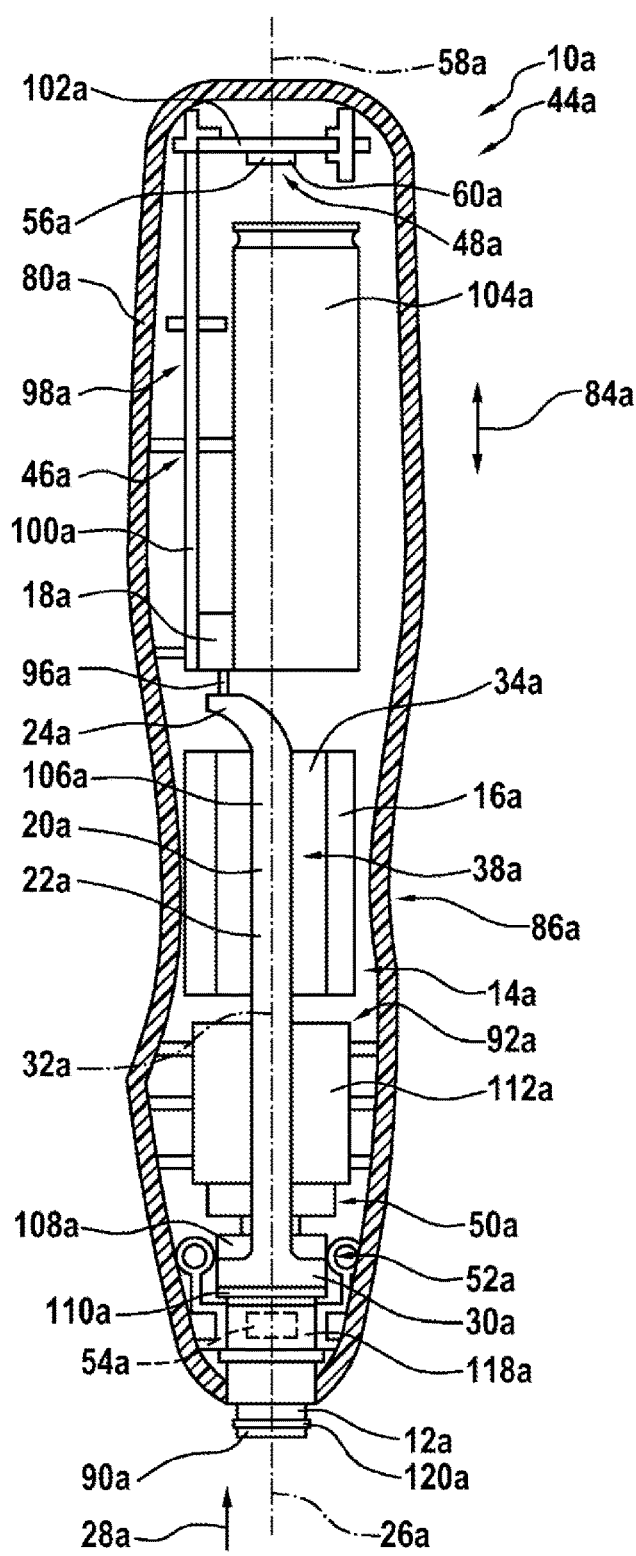
FIG. 3 depicts a hand-held power tool according to the disclosure, in an alternative schematic, partially sectional representation having a section plane turned by 90° relative to FIG. 2.

The hand-held power tool 10a additionally has an active drive unit 14a. The active drive unit 14a comprises a motor unit 16a and a transmission unit 92a. The motor unit 16a and the transmission unit 92a are disposed in succession in the housing unit 44a, along the direction of main extent 84a of the hand-held power tool 10a. The motor unit 16a and the transmission unit 92a are directly connected to each other, for the purpose of transmitting a rotational speed and a torque. The motor unit 16a has a motor shaft 94a, which projects directly into the transmission unit 92a. This makes it possible to achieve, in particular, a compact design (FIGS. 2, 3).

The transmission unit 92a is constituted by a planetary gearing. The transmission unit 92a is constituted by a planetary gearing having three gear stages. The transmission unit 92a has a transmission housing 112a that encloses a remainder of the transmission unit 92a (FIGS. 2, 3).

Figure 8:
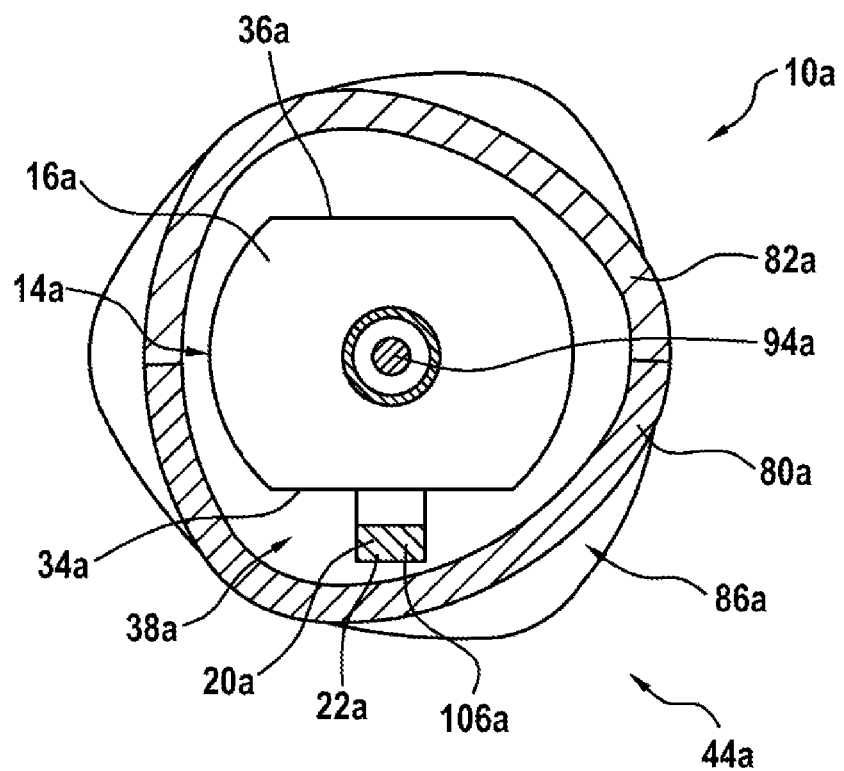
FIG. 8 depicts a hand-held power tool according to the disclosure, in a schematic sectional representation having a section plane perpendicular to a direction of main extent of the hand-held power tool.

The motor unit 16a is constituted by an electric motor. The motor unit 16a has two flat portions 34a, 36a that are parallel to a rotation axis 32a of the motor unit 16a. The rotation axis 32a constitutes a rotation axis 32a of the motor shaft 94a, and is parallel to the direction of main extent 84a of the hand-held power tool 10a. The rotation axis 32a constitutes a rotation axis 32a for the entire active drive unit 14a. The motor unit 16a is partially cylindrical in form, having the two opposite flat portions 34a, 36a, which interrupt an outer cylinder surface of the motor unit 16a. The flat portions 34a, 36a, as viewed along the rotation axis 32a, extend over an entire extent of the motor unit 16a. The motor unit 16a is disposed in the housing unit 44a, in the region of the taper 86a of the housing unit 44a (FIG. 8).

The hand-held power tool 10a additionally has an electrical switching element 18a, which is provided to activate a rotary motion of the motor unit 16a. The electrical switching element 18a is constituted by an electrical switch having a pushbutton 96a. The electrical switching element 18a is disposed on a circuit board 98a of an activation unit 46a. The activation unit 46a is constituted by control electronics. The circuit board 98a of the activation unit 46a is realized in two parts. One sub-region 100a of the circuit board 98a has a plane of main extent that is aligned parallelwise in relation to the direction of main extent 84a of the hand-held power tool 10a. A second sub-region 102a of the hand-held power tool 10a has a plane of main extent that is aligned perpendicularly in relation to the direction of main extent 84a of the hand-held power tool 10a. A particularly compact hand-held power tool 10a can be provided by bending the circuit board 98a. The activation unit 46a is disposed behind the motor unit 16a, in a region of the housing unit 44a that faces away from the tool receiver 12a (FIGS. 2, 3).

The hand-held power tool 10a additionally has an energy storage device 104a. The energy storage device 104a is constituted by a battery device. The energy storage device 104a is constituted by a cylindrical lithium-ion battery. The energy storage device 104a is disposed behind the motor unit 16a, close to the activation unit 46a, in a region of the housing unit 44a that faces away from the tool receiver 12a. A direction of main extent of the energy storage device 104a extends parallelwise in relation to the direction of main extent 84a of the hand-held power tool 10a. The activation unit 46a is electrically connected to the energy storage device 104a via the electrical switching element 18a (FIGS. 2, 3).

The activation unit 46a is provided to control the active drive unit 14a. The activation unit 46a is provided to control the motor unit 16a of the active drive unit 14a. The activation unit 46a is electrically connected to the motor unit 16a, in a manner not represented further.

Furthermore, the hand-held power tool 10a has a mechanical switching element 20a for transmitting a switching signal along a rotation axis 26a of the tool receiver 12a to the electrical switching element 18a, across the entire active drive unit 14a. The mechanical switching element 20a is guided past the motor unit 16a, in a region 38a of the flat portion 34a (FIG. 8). The mechanical switching element 20a is constituted by a switching slide 22a. The switching slide 22a has a web-shaped sub-region 106a, which constitutes a substantial part of the switching slide 22a. The web-shaped sub-region 106a constitutes a central sub-region of the switching slide 22a. A direction of main extent of the web-shaped sub-region 106a is parallel to the direction of main extent 84a of the hand-held power tool 10a. The switching slide 22a additionally has a sub-region 24a that is angled relative to the rotation axis 26a of the tool receiver 12a, in a region that faces away from the tool receiver 12a. The angled sub-region 24a directly adjoins the web-shaped sub-region 106a. A ring element 30a is disposed on a side that faces away from the angled sub-region 24a, or on a aide of the switching slide 22a that faces toward the tool receiver 12a. The ring element 30a is provided for connecting the switching slide 22a to the tool receiver 12a in a form-fitting manner. Via the ring element 30a, the switching slide 22a is connected to the tool receiver 12a in a form-fitting manner. The ring element 30a extends in a plane perpendicular to the direction of main extent 84a of the hand-held power tool 10a. The ring element 30a directly adjoins the web-shaped sub-region 106a of the switching slide 22a. The switching slide 22a is realized as a single piece, and is made of polyoxymethylene (FIGS. 2, 3).

Figure 5:
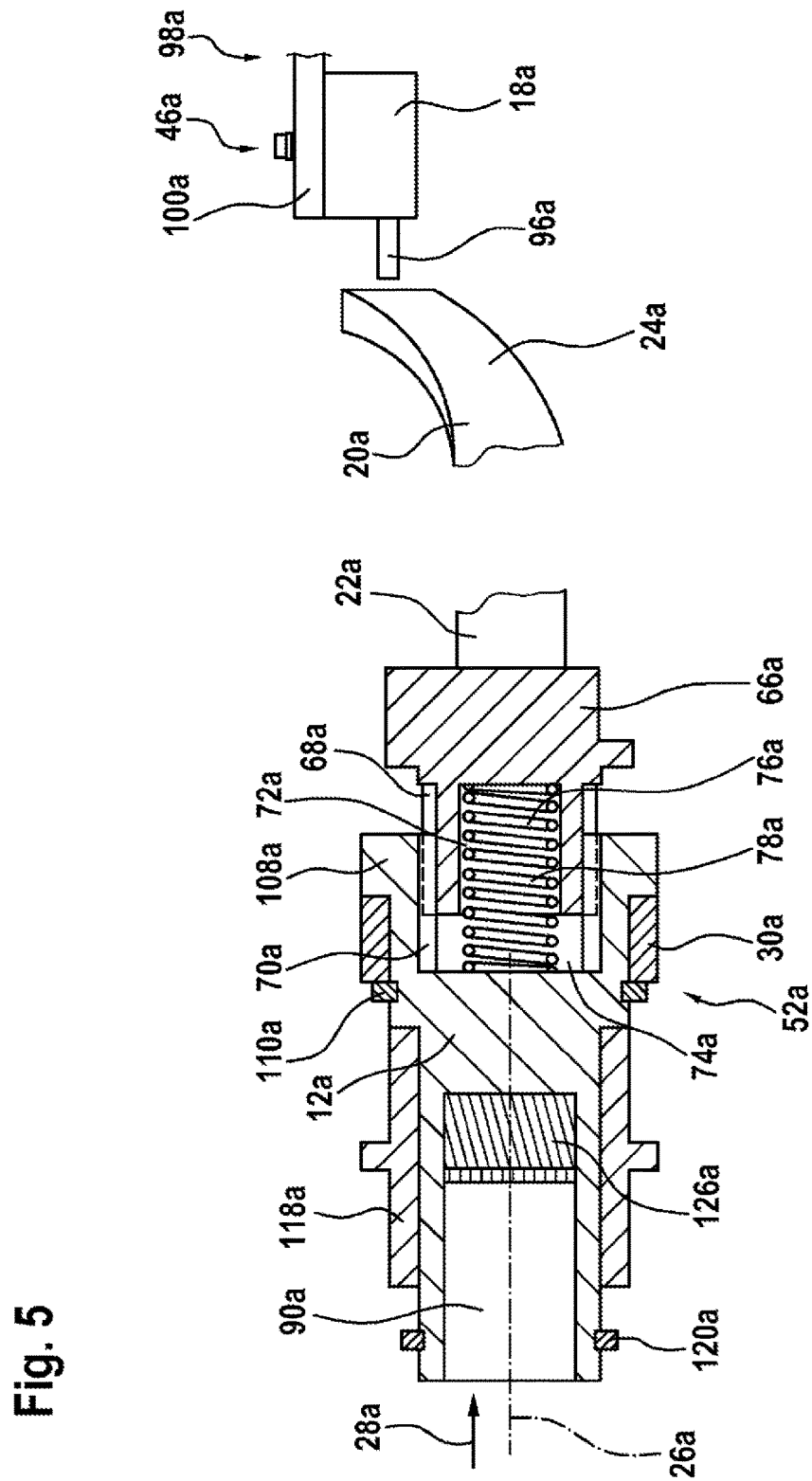
FIG. 5 depicts a tool receiver, a drive spindle, a mechanical switching element and an electrical switching element of a hand-held power tool according to the disclosure in an initial position, in a schematic sectional representation.
Figure 6:
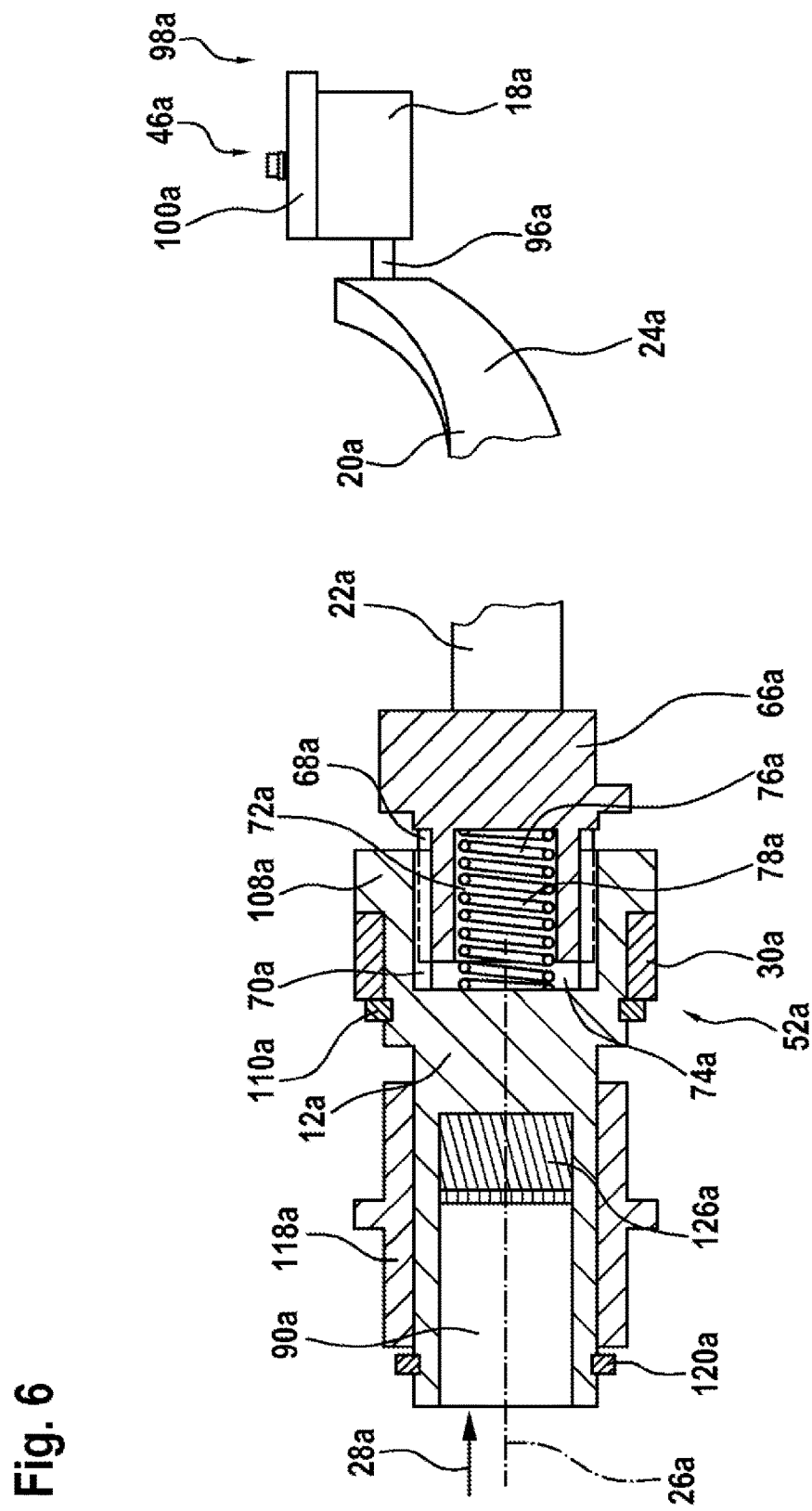
FIG. 6 depicts the tool receiver, the drive spindle, the mechanical switching element and the electrical switching element of a hand-held power tool according to the disclosure in an operating position, in a schematic sectional representation.

The tool receiver 12a, as viewed along the direction of main extent 84a of the hand-held power tool 10a, on a side that faces toward the transmission unit 92a, has a circumferential elevation 108a that extends around the rotation axis 26a in the circumferential direction. When the hand-held power tool 10a is in the assembled state, the ring element 30a of the switching slide 22a bears against the elevation 108a and encompasses the tool receiver 12a. On a side of the ring element 30a that faces away from the elevation 108a there is a retaining ring 110a disposed in a groove. The ring element 30a is thereby axially and radially connected to the tool receiver 12a in a form-fitting manner. In the circumferential direction, the tool receiver 12a can be moved, or turned, relative to the ring element 30a. Since the switching slide 22a is made of polyoxymethylene, it is possible, advantageously, to realize a low-friction rotation between the ring element 30a and the tool receiver 12a. The switching signal that is transmitted by the switching slide 22a is constituted by an axial movement 28a of the tool receiver 12a relative to the active drive unit 14a. The axial movement 28a of the tool receiver 12a is transmitted to the entire switching slide 22a via the ring element 30a. The purpose of the switching signal is to indicate an activation of the hand-held power tool 10a. If the tool receiver 12a executes an axial movement 28a in the direction of the active drive unit 14a, in particular caused by an operator pressing the hand-held power tool 10a onto a working surface, it is intended that this indicates that an operator wishes to activate the hand-held power tool 10a. As a result of the axial movement 28a of the tool receiver 12a, the switching slide 22a likewise executes the axial movement 28a. The angled sub-region 24a of the switching slide 22a in this case presses the pushbutton 96a of the electrical switching element 18a inward, and thereby closes a contact of the electrical switching element 18a. By means of the electrical switching element 18a, the activation unit 46a is supplied with energy from the energy storage device 104a (FIGS. 5, 6).

Figure 4:
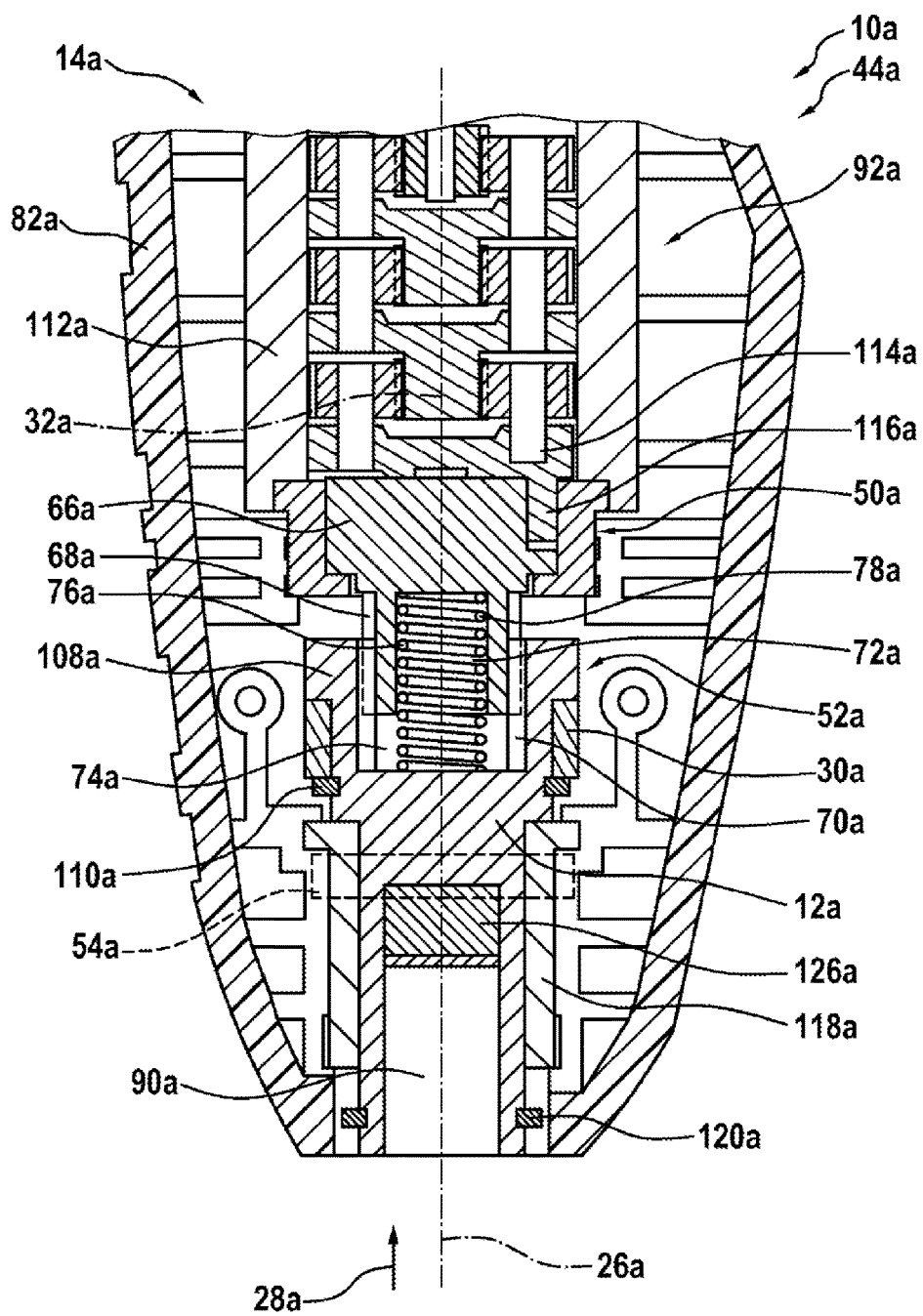
FIG. 4 depicts a portion of a hand-held power tool according to the disclosure, in a schematic full sectional representation having a section plane corresponding to FIG. 3.

A spindle lock device 50a and a drive spindle 66a are disposed between the transmission unit 92a and the tool receiver 12a, both spatially and along a power flow. The spindle lock device 50a is provided to prevent a rotary motion of the tool receiver 12a when the hand-held power tool 10a is in a switched-off state. The spindle lock device 50a is provided to block the tool receiver 12a against turning in the absence of transmission of rotational speed and/or torque from the active drive unit 14a. The spindle lock device 50a directly adjoins the transmission unit 92a. The spindle lock device 50a is disposed in the housing unit 112a of the transmission unit 92a. A final planet carrier 114a of the transmission unit 92a that is assigned to the spindle lock device 50a is realized so as to be integral with a driver element 116a of the spindle lock device 50a. The planet carrier 114a transmits a rotary motion of the transmission unit 92a to the driver element 116a of the spindle lock device 50a. Via cylinder rollers that are not represented further, the driver element 116a transmits a rotary motion of the transmission unit 92a to the drive spindle 66a, which is mounted in the housing unit 112a of the transmission unit 92a. The spindle lock device 50a prevents a rotary motion from being transmitted from the drive spindle 66a, via the cylinder rollers, not represented further, to the driver element 116a. In the case of a rotary motion being transmitted from the drive spindle 66a, via the cylinder rollers, not represented further, to the driver element 116a, the cylinder rollers, not represented further, become wedged between the drive spindle 66a and the housing unit 112a, in the region of the spindle lock device 50a, such that a rotary motion is prevented. The tool receiver 12a is driven by the active drive unit 14a, via the drive spindle 66a. The drive spindle 66a is sintered, and subjected to a hardening process during production. Calibrated tools are used in the sintering process (FIG. 4).

Figure 7:
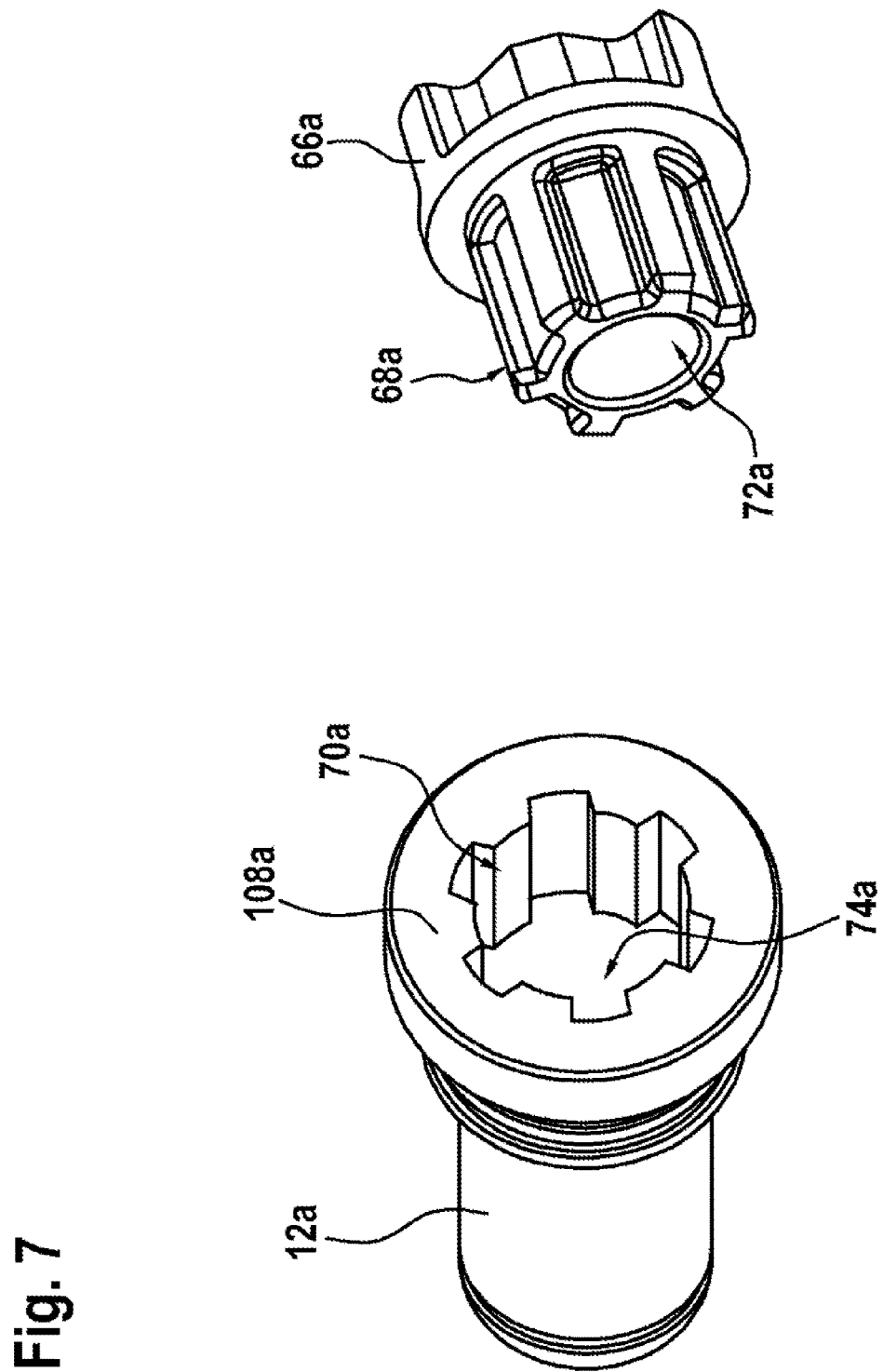
FIG. 7 depicts the tool receiver and the drive spindle with a form-fit connection of a hand-held power tool according to the disclosure, in a schematic exploded representation.

The tool receiver 12a and the drive spindle 66a are realized such that they are separate from each other and connected in the circumferential direction via a form-fit connection 52a. The form-fit connection 52a is on a side of the drive spindle 66a that faces away from the transmission unit 92a. The form-fit connection 52a serves to transmit rotational speed and torque between the drive spindle 66a and the tool receiver 12a. The form-fit connection 52a is constituted by mutually corresponding fitting tooth systems 68a, 70a. The drive spindle 66a has an external fitting tooth system 68a, which corresponds with an internal fitting tooth system 70a of the tool receiver 12a. A fit of the fitting tooth systems 68a, 70a of the drive spindle 66a and of the tool receiver 12a is realized as a sliding fit. Between the tool receiver 12a and the active drive unit 14a there is a circumferential play, in the circumferential direction, about the rotation axis 26a of the tool receiver 12a. The form-fit connection 52a has a circumferential play, in the circumferential direction, about the rotation axis 26a of the drive spindle 66a and of the tool receiver 12a. There is a circumferential play between the external fitting tooth system 68a of the drive spindle 66a and the internal fitting tooth system 70a of the tool receiver 12a. The circumferential play is approximately 2°. In addition, the drive spindle 66a and the tool receiver 12a are disposed so as to be axially displaceable in relation to each other, to a limited extent, via the form-fit connection 52a. The fitting tooth systems 68a, 70a of the form-fit connection 52a have axially extending tooth flanks, such that the fitting tooth systems 68a, 70a are axially displaceable against each other. The drive spindle 66a is disposed in an axially and radially fixed position in the housing unit 44a of the hand-held power tool 10a. By means of a plain bearing 118a, the tool receiver 12a is disposed in a radially fixed position in the housing unit 44a of the hand-held power tool 10a. The tool receiver 12a is movable in an axially delimited manner in the plain bearing 118a. Upon an axial movement 28a of the tool receiver 12a, the plain bearing 118a strikes against a step in the tool receiver 12a, on a side that faces toward the drive spindle 66a, and on a retaining ring 120a in a groove of the tool receiver 12a, on a side that faces away from the drive spindle 66a. The plain bearing 118a is fixedly connected to the housing unit 44a of the hand-held power tool 10a (FIGS. 4, 7).

In the region of the form-fit connection 52a, the tool receiver 12a and the drive spindle 66a each have a receiving region 72a, 74a, for receiving a reset element 76a. The receiving regions 72a, 74a are each oriented toward the other, and thus form a large closed receiving region. The receiving region 72a of the drive spindle 66a is constituted by a cylindrical recess on an end face that faces toward the tool receiver 12a. The receiving region 74a of the tool receiver 12a is constituted by a cylindrical recess, the internal fitting tooth system 70a being disposed on the circumferential surface thereof. The reset element 76a is provided to move the tool receiver 12a, relative to the drive spindle 66a, into an initial position, or hold it in the latter. The "initial position" is to be understood to mean a maximum possible axial extent of the drive spindle 66a, jointly with the tool receiver 12a, along the direction of main extent 84a. In the initial position, the plain bearing 118a bears against the step in the tool receiver 12a and delimits a further axial extent. The reset element 76a is constituted by a coil spring 78a. When in an assembled state, the reset element 76a is supported axially both on the drive spindle 66a and on the tool receiver 12a, and forces them apart with a restoring force. A weight force of the hand-held power tool 10a is less than the restoring force of the reset element 76a. Since the weight force of the hand-held power tool 10a is less than the restoring force of the reset element 76a, it is possible to place the hand-held power tool 10a without unintentionally activating the hand-held power tool 10a (FIG. 4).

The activation unit 46a has an acquisition unit 48a for determining a desired operating state. The acquisition unit 48a is provided to acquire characteristic quantities of a rotational speed difference between the tool receiver 12a and the active drive unit 14a, in the circumferential direction, about the rotation axis 32a of the active drive unit 14a and the rotation axis 26a of the tool receiver 12a. The rotation axis 32a of the active drive unit 14a is disposed coaxially in relation to the rotation axis 26a of the tool receiver 12a. The activation unit 46a is provided to determine a desired direction of rotation of the tool receiver 12a. The acquisition unit 48a is further provided to acquire a characteristic quantity of a circumferential play, in the circumferential direction, about the rotation axis 26a of the tool receiver 12a, for the purpose of determining a desired direction of rotation (FIGS. 2, 3).

The acquisition unit 48a has a sensor unit 56a, which is provided to acquire a rotary motion of the housing unit 44a relative to the tool receiver 12a. The sensor unit 56a is provided to acquire a rotary motion of the housing unit 44a relative to an environment. The sensor unit 56a has a measuring axis 58a, which is aligned coaxially in relation to the rotation axis 26a of the tool receiver 12a. The sensor unit 56a is constituted by a rotation rate sensor 60a. The rotation rate sensor 60a is disposed on the circuit board 98a of the activation unit 46a. The rotation rate sensor 60a is disposed on the second sub-region 102a of the circuit board 98a. The rotation rate sensor 60a is disposed, on the circuit board 98a, on the rotation axis 26a of the tool receiver 12a (FIGS. 2, 3).

The acquisition unit 48a additionally has a sensor unit 54a for acquiring a characteristic quantity of a rotational speed of the tool receiver 12a. The sensor unit 54a is constituted by a rotational-speed sensor. The sensor unit 54a is constituted by a Hall sensor. The sensor unit 54a is provided to acquire a rotary motion of the tool receiver 12a relative to the active drive unit 14a and relative to the housing unit 44a. An encoder ring of the sensor unit 54a is fixedly connected to the tool receiver 12a. A sensor element of the sensor unit 54a is fixedly connected to the housing unit 44a (FIG. 4).

In the case of a planned operation of the hand-held power tool 10a by an operator, a tool, not represented further, is inserted in the tool receiver 12a, in a first step. If the hand-held power tool 10a is then pressed, with the tool receiver 12a foremost along the direction of main extent 84a, against a work surface, in particular against a screw, the tool receiver 12a is displaced axially against the drive spindle 66a. As a result, the switching slide 22a is simultaneously shifted axially in the direction of the electrical switching element 18a. The angled sub-region 24a of the switching slide 22a in this case presses the pushbutton 96a of the electrical switching element 18a inward, and thereby closes a contact of the electrical switching element 18a (FIG. 6). As a result, the activation unit 46a is supplied with energy from the energy storage device 104a, and is thereby activated. If the hand-held power tool 10a is then rotated into a desired direction of rotation, the tool receiver 12a is subject to an inertia, because of the screw in which a tool of the tool receiver 12a sits. As a result, a relative movement is produced, between the tool receiver 12a and a remainder of the hand-held power tool 10a, which is rendered possible by the circumferential play of the form-fit connection 52a. This relative movement is acquired, in the form of a rotational speed difference, by means of the sensor units 54a, 56a. The activation unit 46a thus determines a desired direction of rotation by means of the acquisition unit 48a. The activation unit 46a then controls the motor unit 16a according to the desired direction of rotation, and the motor unit 16a starts in the defined direction of rotation. If an operator wishes to terminate operation of the hand-held power tool 10a or to change a direction of rotation, the operator removes a pressure upon the screw by the hand-held power tool 10a. The tool receiver 12a is moved back into the initial position by the reset element 76a. The switching slide 22a in this case moves axially away from the electrical switching element 18a, the pushbutton 96a moves outward, and the contact of the electrical switching element 18a is opened (FIG. 5). Operation can then be terminated, or the operation can be recommenced for the purpose of changing a direction of rotation. It is thereby possible, in particular, to achieve intuitive operation. Moreover, it is possible to dispense with a separate on/off switch, thereby making it possible, in turn, to realize a simple and inexpensive sealing of the electric power tool, e.g. against dirt, water or dust.

In principle, however, it would also be conceivable for a desired direction of rotation to be set via a manual operating element, whereby it would be possible to realize savings in, for example, sensors.

In principle, however, it would also be conceivable for the acquisition unit 48a to be provided to acquire a characteristic quantity of a relative force between the tool receiver 12a and the active drive unit 14a. For this, a force pick-up, not represented further, could be integrated into the form-fit connection 52a, the force pick-up acquiring a relative force in the circumferential direction between the fitting tooth systems 68a, 70a. A desired direction of rotation can thereby be acquired.

It would also be conceivable in principle for the acquisition unit 48a to be provided to acquire a characteristic quantity of a torque between the tool receiver 12a and the active drive unit 14a. For this, a sensor unit, not represented further, could be fitted, the sensor unit determining a torque between the tool receiver 12a and the active drive unit 14a. In particular, no circumferential play would be required for this.

Further exemplary embodiments of the disclosure are shown in FIGS. 9 to 14. The following descriptions and the drawings are limited substantially to the differences between the exemplary embodiments and, in principle, reference may also be made to the drawings and/or the description of the other exemplary embodiments, in particular of FIGS. 1 to 8, in respect of components having the same designation, in particular in respect of components having the same reference numerals. To differentiate the exemplary embodiments, the letter a has been appended to the reference numerals of the exemplary embodiment in FIGS. 1 to 8. In the exemplary embodiments of FIGS. 9 to 14, the letter a has been replaced by the letters b to f.

Figure 9:
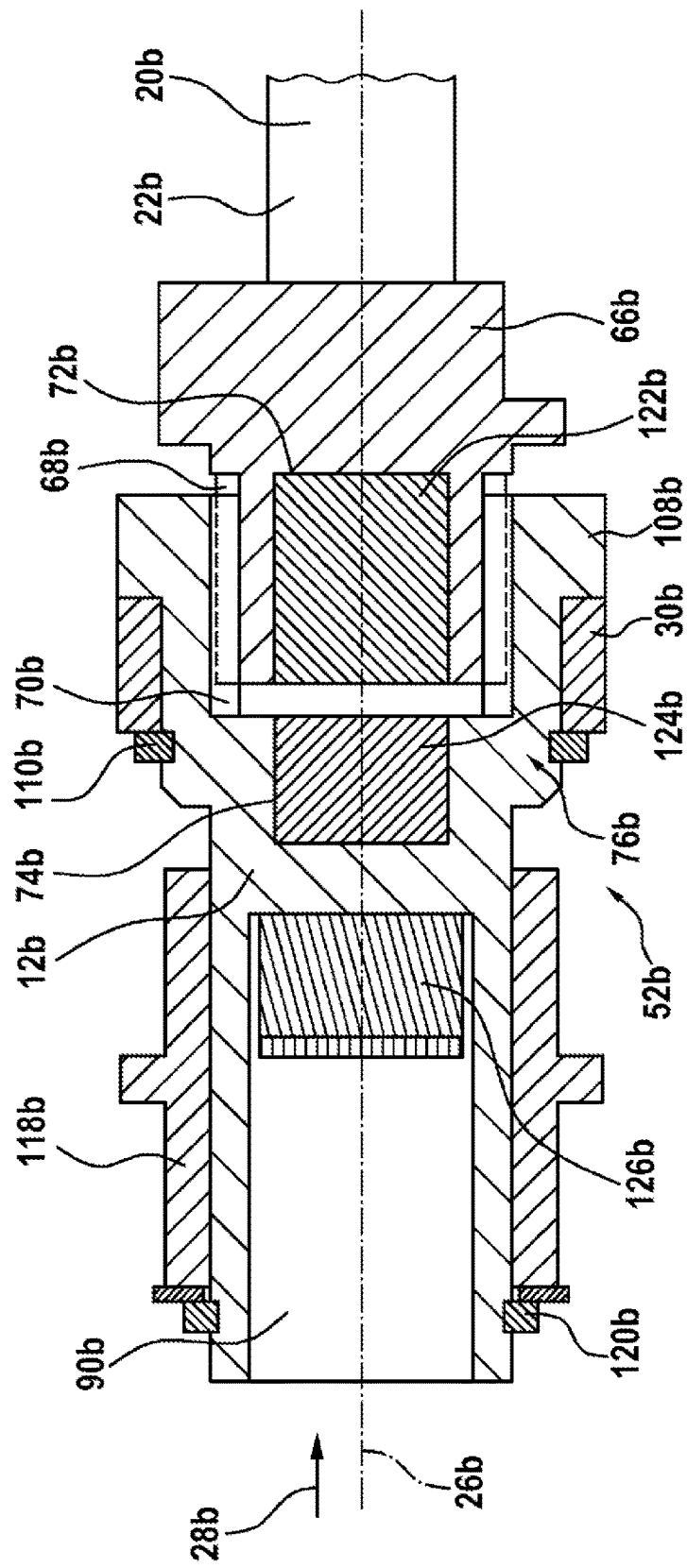
FIG. 9 depicts a tool receiver, a drive spindle, a mechanical switching element and a reset element of an embodiment of a hand-held power tool according to the disclosure, in a schematic sectional representation.

FIG. 9 shows a tool receiver 12b, a drive spindle 66b, a mechanical switching element 20b and a reset element 76b of an alternative hand-held power tool 10b according to the disclosure. The reset element 76b is constituted by two magnet elements 122b, 124b. The magnet element 122b is disposed in a receiving region 72b of the drive spindle 66b. The second magnet element 124b is disposed in a receiving region 74b of the tool receiver 12b. The magnet elements 122b, 124b are adhesive-bonded into the receiving regions 72b, 74b. The magnet elements 122b, 124b are mutually repelling.

It would also be conceivable in principle for the magnet element 124b that is disposed in the receiving region 74b of the tool receiver 12b to be realized so as to be integral with a magnet element 126b of a bit holder 90b of the tool receiver 12b.

Figure 10:
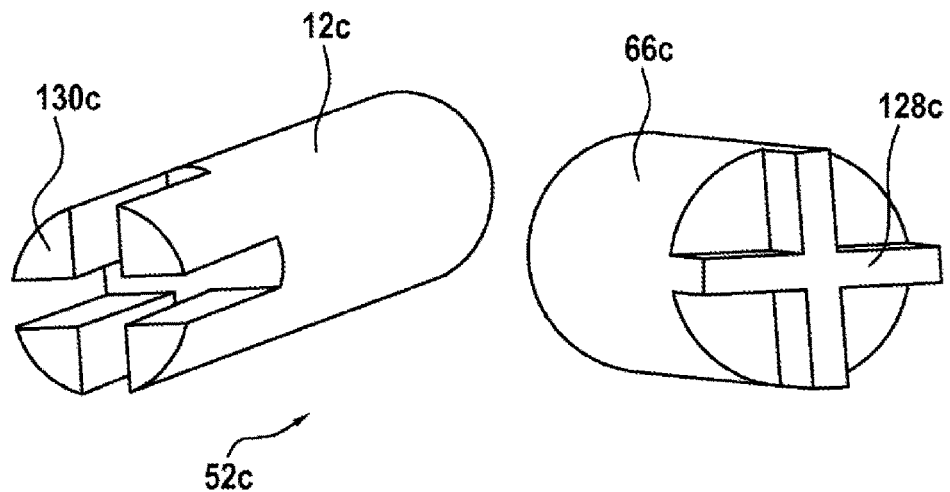
FIG. 10 depicts a tool receiver and a drive spindle with a form-fit connection of a further embodiment of a hand-held power tool according to the disclosure, in a schematic exploded representation.
Figure 11:
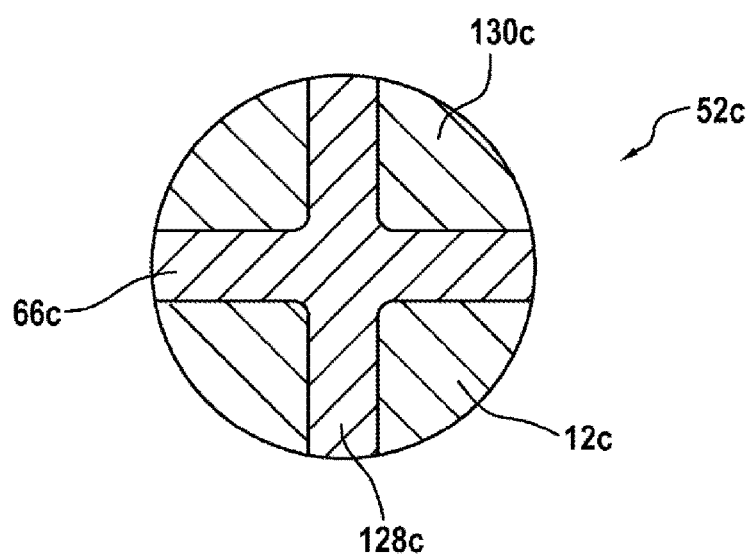
FIG. 11 depicts the form-fit-connection of the tool receiver and of the drive spindle of a further embodiment of a hand-held power tool according to the disclosure in an assembled state, in a schematic sectional representation.

FIG. 10 shows a tool receiver 12c and a drive spindle 66c, with a form-fit connection 52c of a further alternative hand-held power tool 10c according to the disclosure, in a schematic exploded representation. The form-fit connection 52c is constituted by corresponding cross-recess connecting elements 128c, 130c. The drive spindle 66c has the first cross-recess connecting element 128c. The cross-recess connecting element 128c is constituted by an axial extension. The cross-recess connecting element 128c, as viewed perpendicularly to a rotation axis 26c of the tool receiver 12c, has a constant cross-shaped cross section. The tool receiver 12c has the second cross-recess connecting element 130c. The cross-recess connecting element 130c is constituted by an axial extension. The cross-recess connecting element 130c is constituted by a cylindrical extension having an axially extending recess. The recess, as viewed perpendicularly to the rotation axis 26c of the tool receiver 12c, has a constant cross-shaped cross section. The second cross-recess connecting element 130c constitutes a negative of the first cross-recess connecting element 128c (FIG. 11). For reasons of clarity, receiving regions 72c, 74c for a reset element 76c are not represented further.

Figure 12:
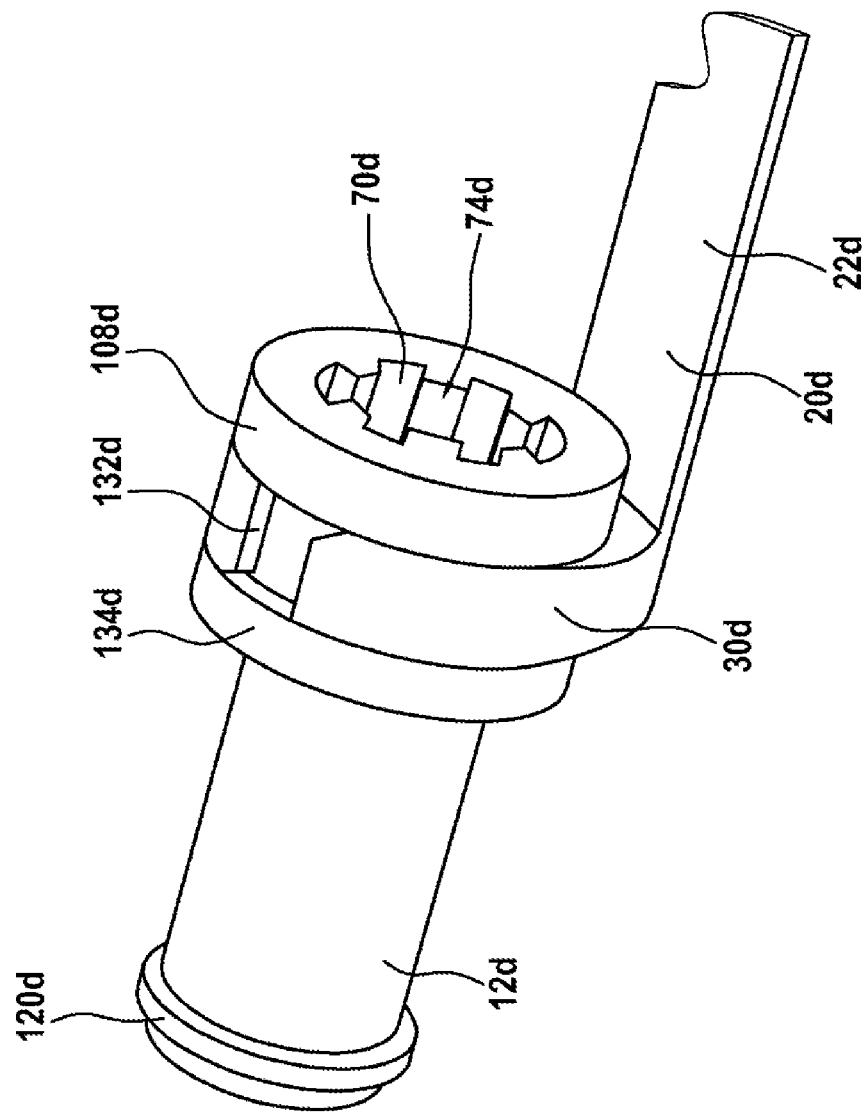
FIG. 12 depicts a tool receiver and a mechanical switching element of a further alternative embodiment of a hand-held power tool according to the disclosure, in a schematic representation, FIG. 13 a tool receiver, a drive spindle, a mechanical switching element and an electrical switching element of a further alternative embodiment of a hand-held power tool according to the disclosure, in a schematic sectional representation.

FIG. 12 shows a tool receiver 12d and a mechanical switching element 20d for a further alternative hand-held power tool 10d according to the disclosure. The mechanical switching element 20d is constituted by a switching slide 22d. The switching slide 22d has a web-shaped sub-region 106d, which constitutes a substantial part of the switching slide 22d. The switching slide 22d, on the side thereof that faces toward the tool receiver 12d, has a ring element 30d. The ring element 30d is realized in the form of a divided circle and, accordingly, has an opening 132d. The opening 132d is disposed opposite a connecting point that has the web-shaped sub-region 106d. The ring element 30d is provided for connecting the switching slide 22d to the tool receiver 12d in a form-fitting manner. By means of the ring element 30d, the switching slide 22d is connected to the tool receiver 12d in a form-fitting manner. The ring element 30d extends in a plane perpendicular to a direction of main extent 84d of the hand-held power tool 10d. The tool receiver 12d, as viewed along the direction of main extent 84d of the hand-held power tool 10d, on a side that faces toward a transmission unit 92d, has two circumferential elevations 108d, 134d that extend around a rotation axis 26d, in the circumferential direction. When the hand-held power tool 10d is in an assembled state, the ring element 30d of the switching slide 22d is disposed directly between the elevations 108d, 134d, and encompasses the tool receiver 12d. Owing to the opening 132d, the ring element 30d can be easily clipped on to the tool receiver 12d for the purpose of assembly.

Figure 13:
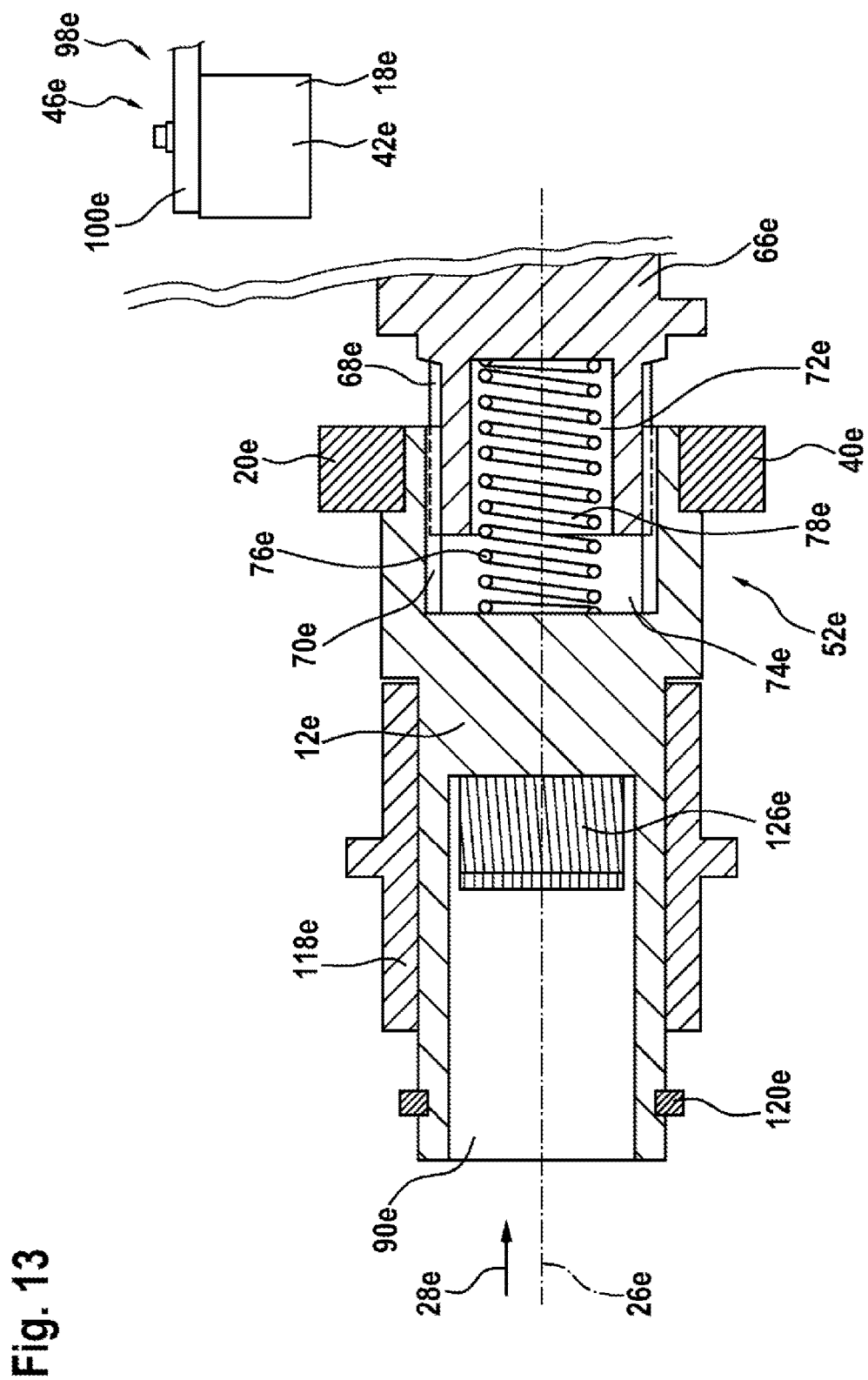

FIG. 13 shows a tool receiver 12e, a drive spindle 66e, a mechanical switching element 20e and an electrical switching element 18e of a further alternative hand-held power tool 10e according to the disclosure. The mechanical switching element 20e is constituted by a magnet element 40e. The magnet element 40e is constituted by a permanent-magnet ring, which is pressed onto the tool receiver 12e, on a side that faces toward the drive spindle 66e. The magnet element 40e is provided to transmit a switching signal to the electrical switching element 18e across an active drive unit 14e. The electrical switching element 18e is constituted by a reed switch 42e. The electrical switching element 18e is disposed on a circuit board 98e of an activation unit 46e.

If the magnet element 40e then approaches the reed switch 42e as a result of pressure upon tool receiver 12e, the magnetic field of the magnet element 40e moves toward the reed switch 42e. As a result of the approach of the magnetic field, the two contact elements of the reed switch 42e move toward each other until they touch each other, and close a contact.

It would also be conceivable in principle for the magnet element 40e to be realized so as to be integral with a reset element 76e that is constituted by two magnet elements and/or realized so as to be integral with a magnet element 126e of a bit holder 90e of the tool receiver 12e.

Figure 14:
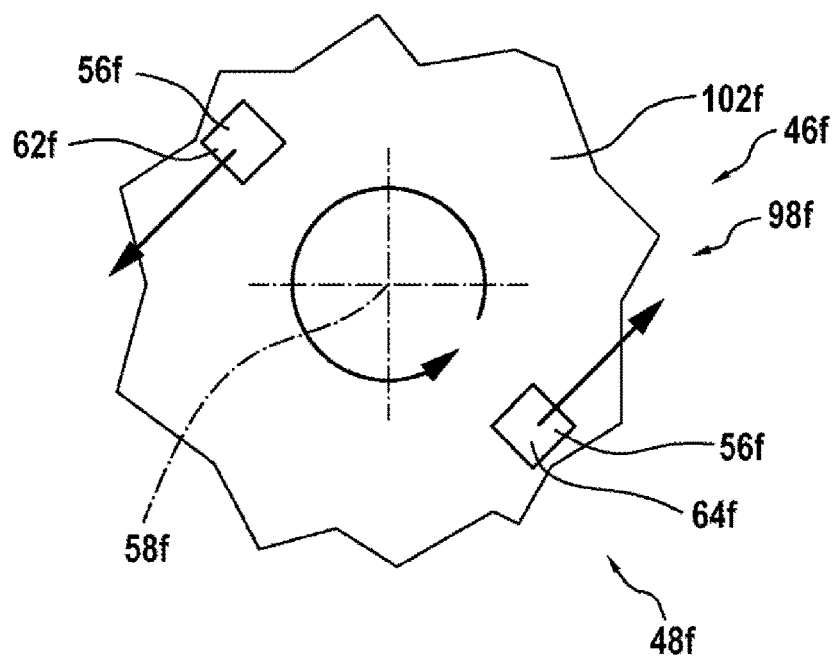
FIG. 14 depicts a sensor unit of a further alternative embodiment of a hand-held power tool according to the disclosure, in a schematic representation.

FIG. 14 shows a sensor unit 56f of a further alternative hand-held power tool 10f according to the disclosure. The sensor unit 56f is constituted by two acceleration sensors 62f, 64f. The sensor unit 56f has a measuring axis 58f, which is aligned coaxially in relation to a rotation axis 26f of a tool receiver 12f. The acceleration sensors 62f, 64f are disposed on a circuit board 98f of an activation unit 46f. The acceleration sensors 62f, 64f are disposed on a second sub-region 102f of the circuit board 98f. The acceleration sensors 62f, 64f are disposed on the circuit board 98f in such a manner that they are equidistant from the rotation axis 26f of the tool receiver 12f. The acceleration sensors 62f, 64f are disposed on opposite sides of the rotation axis 26f of the tool receiver 12f.

The invention claimed is:

1. A hand-held power tool, comprising:
    a drive spindle that is rotatable about a rotation axis;
    a tool receiver that is axially movable relative to the drive spindle, and that is rotationally connected to the drive spindle via a form-fit connection with circumferential play such that the drive spindle and the tool receiver are rotatable about the rotation axis relative to each other over an extent of the circumferential play without rotational engagement; and
    at least one active drive unit configured to selectively drive the tool receiver via the drive spindle around the rotation axis based on at least one characteristic quantity of the circumferential play.

2. The hand-held power tool as claimed in claim 1, wherein the form-fit connection includes mutually corresponding fitting tooth systems.

3. The hand-held power tool as claimed in claim 2, wherein the fitting tooth systems have a sliding fit.

4. The hand-held power tool as claimed in claim 1, wherein the drive spindle and the tool receiver are axially displaceable with respect to each other to at least a limited extent via the form-fit connection.

5. The hand-held power tool as claimed in claim 1, further comprising:
    at least one acquisition unit configured to acquire the at least one characteristic quantity of the circumferential play, wherein the at least one active drive unit is further configured to selectively drive the tool receiver in a drive direction around the rotation axis, the drive direction based on the at least one characteristic quantity of the circumferential play.

6. The hand-held power tool as claimed in claim 1, wherein the at least one active drive unit is configured to activate in response to an axial displacement of the tool receiver away from an initial axial position relative to the drive spindle.

7. The hand-held power tool as claimed in claim 6, further comprising:
    a reset element configured to bias the tool receiver relative to the drive spindle toward the initial axial position, the reset element received in at least one receiving region of the form-fit connection of at least one of the tool receiver and the drive spindle.

8. The hand-held power tool as claimed in claim 7, wherein the hand-held power tool has a weight force that is less than or equal to a restoring force of the reset element.

9. The hand-held power tool as claimed in claim 7, wherein the reset element includes at least one coil spring.

10. The hand-held power tool as claimed in claim 1, wherein at least one of the tool receiver and the drive spindle are at least one of at least partially sintered and subjected to a hardening process.

11. The hand-held power tool of claim 1, wherein at least one of the tool receiver and the drive spindle is at least partially sintered by calibrated tools.

12. A hand-held power tool, comprising:
a housing unit;
a tool receiver; and
at least one active drive unit configured to drive the tool receiver about a rotation axis, and including:
  at least one motor unit;
  at least one acquisition unit configured to detect at least one characteristic quantity of at least one of:
    a torque of the tool receiver in a circumferential direction about the rotation axis relative to a corresponding torque of the at least one active drive unit;
    a force of the tool receiver in the circumferential direction relative to a corresponding force of the at least one the active drive unit; and
    a rotational speed of the tool receiver in the circumferential direction relative to a corresponding rotational speed of the at least one active drive unit; and
  an activation unit configured to control the active drive unit and determine a direction of rotation for the tool receiver about a rotation axis based on the at least one characteristic quantity.

13. The hand-held power tool as claimed in claim 12, further comprising:
a spindle lock device configured to block the tool receiver against turning in the absence of transmission of at least one of rotational speed and torque from the at least one active drive unit.

14. The hand-held power tool as claimed in claim 12, wherein the tool receiver and the at least one active drive unit are configured to have circumferential play in the circumferential direction about the rotation axis.

15. The hand-held power tool as claimed in claim 14, wherein the tool receiver and the at least one active drive unit are separate from each other and are connected in the circumferential direction via a form-fit connection.

16. The hand-held power tool as claimed in claim 12, wherein the at least one acquisition unit has at least one sensor unit configured to acquire at least one characteristic quantity of the rotational speed of the tool receiver.

17. The hand-held power tool as claimed in claim 12, wherein the at least one acquisition unit has at least one sensor unit configured to acquire a rotary motion of the housing unit relative to the tool receiver.

18. The hand-held power tool as claimed in claim 17, wherein the at least one sensor unit defines a measuring axis that is aligned coaxially in relation to the rotation axis of the tool receiver.

19. The hand-held power tool as claimed in claim 17, wherein the at least one sensor unit is configured as at least one rotation rate sensor.

20. The hand-held power tool at least as claimed in claim 17, wherein the at least one sensor unit includes at least one acceleration sensor.

* * * * *

UNITED STATES PATENT AND TRADEMARK OFFICE
CERTIFICATE OF CORRECTION

PATENT NO. : 10,029,354 B2
APPLICATION NO. : 14/434068
DATED : July 24, 2018
INVENTOR(S) : Thomas Weller Page 1 of 1

It is certified that error appears in the above-identified patent and that said Letters Patent is hereby corrected as shown below:

On the Title Page

In Item (54), the title should read:
HAND-HELD MACHINE TOOL

Signed and Sealed this
Twenty-second Day of January, 2019

Andrei Iancu
*Director of the United States Patent and Trademark Office*